United States Patent [19]

Kitchens et al.

[11] Patent Number: 4,613,653

[45] Date of Patent: Sep. 23, 1986

[54] MODIFICATION OF POLYMERS

[75] Inventors: John D. Kitchens; Leo R. Novak, both of Lake Jackson, Tex.

[73] Assignee: The Dow Chemical Company, Midland, Mich.

[21] Appl. No.: 713,921

[22] Filed: Mar. 20, 1985

Related U.S. Application Data

[63] Continuation-in-part of Ser. No. 619,515, Jun. 11, 1984, abandoned.

[51] Int. Cl.[4] .................................................. C08F 8/00
[52] U.S. Cl. .................................. 525/352; 525/330.4; 525/333.5; 525/333.9
[58] Field of Search ........................................ 525/352

[56] References Cited

U.S. PATENT DOCUMENTS

| | | |
|---|---|---|
| 2,781,331 | 2/1957 | Jones et al. . |
| 3,350,362 | 10/1967 | Potts . |
| 3,607,536 | 9/1971 | Bragole . |
| 3,867,360 | 2/1975 | Jones . |

OTHER PUBLICATIONS

T. Nagamachi et al., J. Medicinal Chem., 17(4), 403–406 (1974).

R. C. Guy et al., Bulletin Chem. Soc. Japan, 50(2), 541–542 (1977).

Primary Examiner—Paul R. Michl
Attorney, Agent, or Firm—Douglas N. Deline

[57] ABSTRACT

Polymers modified by reaction with thiocyano or isothiocyano generating reactants provide improved adhesive strength to laminates prepared therefrom, improved paint adhesion, increased viscosity and altered gas permeability compared to unmodified polymers.

28 Claims, No Drawings

MODIFICATION OF POLYMERS

CROSS-REFERENCE TO RELATED APPLICATION

This is a continuation-in-part of Applicants' copending application Ser. No. 619,515 filed June 11, 1984 now abandoned.

BACKGROUND OF THE INVENTION

The present invention relates to polymeric modification. More particularly, the present invention relates to the modification of polymers by reaction with thiocyano- or isothiocyano-generating reactants.

In U.S. Pat. No. 3,607,536 to R. A. Bragole, a method for bonding resinous substrates such as polyethylene by radiation induced isocyanate modification thereof is disclosed. After being so modified, the resinous substrate may be easily bonded by adhesives capable of bonding to polyurethane or rubber surfaces.

In U.S. Pat. No. 2,781,331 diene polymers are thiocyanated by reaction with thiocyanogen. By reducing the level of unsaturation through hydrogenation the amount of thiocyanate moieties added to the polymer may be controlled. Similar techniques for thiocyanating ethylenically unsaturated polymers are disclosed in U.S. Pat. No. 2,287,774 and U.S. Pat. No. 3,867,360.

SUMMARY OF THE INVENTION

According to the present invention, a polymer containing essentially no ethylenic unsaturation is modified or functionalized by reaction with thiocyano or isothiocyano generating reactants by a process wherein the polymer (referred to as a precursor polymer) is contacted with a thiocyano or isothiocyano generating reactant under homolytic or heterolytic reaction conditions. Preferably, the precursor polymer comprises at least some reactive hydrogen such as hydrogen bound to carbon moieties of the precursor polymer.

The invention further comprises the modified polymer prepared by the aforementioned process, i.e., a polymer substantially devoid of ethylenic unsaturation that is modified so as to contain the reaction products of a thiocyano or isothiocyano generating reactant and the precursor polymer.

In one embodiment, the present invention comprises a solid polymer having a surface portion and an interior portion such that the surface portion comprises the reaction products of a thiocyano- or isothiocyano generating reactant and the precursor polymer and the interior portion is substantially devoid of such reaction products. As used herein, the term "surface portion" is defined as the outer most portion of the polymeric solid which may be modified by the thiocyano- or isothiocyano-generating reactant upon contacting with such reactants in liquid or gaseous reaction medium. The "interior portion" is defined as any remaining portion of the solid polymer. Preferably, the surface portion extends no further than about 1.0 micron into the polymeric solid from a point of contacting with such reactant.

Modified polymers prepared in the manner of the present invention possess improved physical and chemical properties. By treatment according to the method of the present invention, the modified polymer's resistance to ultraviolet light may be improved over that of an unfunctionalized polymer, antistatic properties may be incorporated into polymers otherwise possessing little inherent antistatic properties, the dye acceptability of polymers may be altered, permeability of polymeric membranes may be tailored to provide the separation of desirable species from solutions, bonding of otherwise difficultly bondable polymers may be greatly facilitated, and subsequent finishing or treating processes including painting, metal deposition, plating, etc., of polymer surfaces may be improved.

Modification of polymers according to the present invention involves at least in part the incorporation of thiocyano or isothiocyano moieties into such polymers by either a homolytic or heterolytic process. However, without desiring to be bound to any particular theory of operation it is also believed that other reaction products besides isothiocyano or thiocyano moieties may be incorporated into the polymers according to the present invention. For example, it is known by means of analysis that certain amounts of amide or sulfonate groups may likewise be present in the resulting polymers, possibly as a result of further reaction of thiocyano or isothiocyano functionality initially incorporated into the polymer, or alternatively such species may form during the modification process, for example in the treating solution, and be incorporated directly into the modified polymer. Such additional functional groups may likewise contribute to the altered physical properties in polymers prepared according to the present invention. Accordingly all such functional groups incorporated into the modified polymers of the invention are included within the term "reaction product of a polymer substantially devoid of ethylenic unsaturation and a thiocyano or isothiocyano generating reactant".

The process of the present invention may proceed by either homolytic or heterolytic mechanisms. In a preferred embodiment an active hydrogen, especially such a hydrogen that is bound to a carbon moiety of the polymer, is replaced according to a standard substitution reaction scheme by reaction with thiocyano or isothiocyano radicals. Alternative mechanisms are also considered possible. For example, the reaction product of the thiocyano or isothiocyano reactant and the precursor polymer may be incorporated into the modified polymer by physical attachment or deposition onto the polymer surface; or reaction with hydroxyl functionality intentionally or unintentionally present on the polymer surface; or by means of a process as yet unknown. Accordingly, the present invented process is not intended to be limited to a particular chemical mechanism or theory of operation it being sufficient that the modified polymers can be prepared according to the procedures hereinafter explained.

DETAILED DESCRIPTION OF THE INVENTION

Polymeric materials suitable for modification according to the present invention include any polymeric material substantially devoid of ethylenic unsaturation, which can be modified by reaction with the present thiocyano or isothiocyano generating reactants under homolytic reaction conditions, such as polymers containing hydrogen bound to carbon moieties of the polymer repeating unit such that the hydrogen is available for replacement so as to form reaction products. In addition suitable precursor polymers include polymeric materials substantially devoid of ethylenic unsaturation, which can be modified by reaction with the present thiocyano or isothiocyano generating reactants under heterolytic reaction conditions, such as polymers containing hydrogen that is reactive under catalytic conditions, polymers containing reactive nitrogen moieties, and so forth. Both aliphatic and aromatic polymers may be modified according to the present invention.

Examples of suitable polymers include addition polymers, i.e., polymers prepared by reaction of one or more ethylenically unsaturated monomers; ring-opened polymerization products, etc.; condensation polymers; or other suitable polymer. More particularly polymers that may be modified according to the present invention include polymers and copolymers of olefins and substituted olefins, monovinylaromatic monomers (with or without a divinyl comonomer), and ethylenically unsaturated carboxylic acids or esters thereof having up to about 12 carbon atoms. Examples include polyethylene, polypropylene, copolymers of ethylene and one or more α-olefins, polyvinylchloride, copolymers of vinylidene chloride and at least one comonomer, polystyrene, polyvinyltoluene, polymethylmethacrylate, polybutylacrylate, polyvinylacetate, styrene/acrylic acid, ethylene/acrylic acid, styrene/maleic anhydride, styrene/acrylonitrile, etc. Ring-opened reaction products include polyalkylene oxides, interpolymers of diglycidyl ethers, polyethyloxazoline, etc. Condensation and addition polymers include polyesters, polyurethanes, polyamides, urea/formaldehyde thermosets, polyphenylene ethers, including ring alkylated or halogenated derivatives thereof, expoxy resins, interpolymers of dihydroxybiphenyl, polycarbonates, polysulfones, polyimides, silicone containing polymers, e.g., polydimethylsilane, etc. Also included are blends or mixtures of polymers with or without the presence of a compatibilizer.

In a preferred embodiment of the invention, solid objects of the above polymers are treated so as to incorporate reaction products of thiocyano or isothiocyano generating reactants and such polymers only on the available surface of such solid. In this manner, advantageous improvements in physical properties may be obtained without use of excessive amounts of thiocyano or isothiocyano generating reactant.

Preferred polymeric materials for use in one embodiment of the present invention are polyolefins, especially polyethylene. When surface treated according to the present invention, solid polyethylene articles such as films or sheets have been found to be adherable to polymeric materials that are normally difficultly bondable. For example, polyethylene objects treated according to the present invention are readily bonded to other resinous objects such as polypropylene, polyamides, polyurethanes, polystyrene, etc. In a preferred embodiment, suitable bonding is achieved merely by contacting the two surfaces to be joined at elevated temperature optionally accompanied by pressure. Accordingly, one advantage of the present invention is that adhesive interlayers for joining differing polymeric materials such as those disclosed in previously mentioned U.S. Pat. No. 3,607,536, may be omitted when joining a modified polymer according to the present invention to another polymeric material.

Additionally, crosslinked polymers may be prepared by first modifying a polymer according to the present invention and subsequently processing the modified polymer so as to allow bond formation between neighboring functional groups. For example modified polyolefins of the invention can be caused to crosslink by exposure to elevated temperatures and/or pressures.

The resulting crosslinked polymer may be shown to possess improved dimensional stability and greater melt stability as evidenced by increased intrinsic viscosity of the compound. It is believed without wishing to be bound by such belief that such crosslinking results through the formation of disulfide, triazine, or dithioether functionality.

In another embodiment of the present invention, it is preferred to employ polyurethane thermosetting resins. It has been found that coatings such as paints applied to reaction injection molded polyurethane articles that have been surface treated according to the present invention demonstrate significantly improved adhesion compared to coatings applied to untreated reaction injection molded polyurethane articles. Suitable coatings include organic polymer films such as lacquers, alkyl enamels, polyurethanes, epoxies, latex coatings, powder coatings, electrodeposited primers, etc.

In still a further embodiment of the present invention, thin films or sheets of permeable polymeric materials such as polyolefins, polyvinyl chloride, vinylidene chloride copolymers, polystyrene, polyethers or polysulfones are modified to provide selective permeability to various materials, especially gases such as carbon dioxide, hydrogen cyanide, methane, sulfur dioxide, etc. In this manner, a membrane may be modified so as to selectively separate one or more gases from a mixture of gases. Alternatively, the polymers may be used to complex metal ions. Sheets of the modified polymer may be used to selectively extract such metal ions from aqueous streams.

The polymeric material treated according to the present invention may be either solid or liquid. Generally, solid resinous objects are preferred due to ease of recovery after treatment. Powders, chips, pellets, extrusions, films, as well as solid objects of considerable physical size and complex shape may be satisfactorily treated. Liquids or solutions of solid polymers may be modified and recovered by casting from solution or solvent evaporation, as desired. Additional forming or machining operations such as pelletizing, stretching, extrusion, compaction, blowing, lamination, pull-trusion, spinning, foaming, painting, plating, vapor deposition or other finishing processes may be performed on polymeric materials modified by the present process.

The thiocyano or isothiocyano generating reactant includes any composition capable of generating reaction products through either free radical or ionic charge transfer mechanisms, i.e., by either a homolytic or heterolytic cleavage process. Suitable reactants include thiocyanochloride, thiocyanobromide, thiocyanogen, thiocyanocyanate, thiocyanoisocyanate, etc. Preferably thiocyanate generating reactants, i.e., thiocyanating agents, are employed.

The preferred method of operation is to generate the above thiocyano or isothiocyano generating reactant in situ in a dilute solution. When so prepared substantially contemporaneously with use in the present treatment process, losses due to decomposition or polymerization of the radical or ion generating reactant are minimized. The reactant may be prepared by any suitable technique or obtained commercially. Suitable methods of preparation include oxidation of thiocyanic acid with manganese dioxide or other oxidizing agent; the action of bromine or chlorine on solutions of metal or ammonium salts of thiocyanic acid or isothiocyanic acid; the electrolysis of ammonium salts such as ammonium thiocyanate, etc. In addition, certain salts, such as ammonium thiocyanate, cupric thiocyanate, etc., may decompose spontaneously in the presence of the polymer to be modified thereby eliminating the need of additional agents to prepare the isothiocyano or thiocyano generating reactant in situ.

In the preparation of the modified polymers of the present invention, the thiocyano or isothiocyano radical-generating reactant or thiocyanate or isothiocyanate ion generating reactant, referred to as "intermediate reactant", is preferably prepared by contacting a metal salt of thiocyanic acid or isothiocyanic acid with a halogen. Suitable metal salts include lead thiocyanate, sodium thiocyanate, potassium thiocyanate, etc. Suitable halogens include chlorine and bromine. The polymeric substance to be modified may be present in the solution at the time of contacting the halogen and metal salt, or added at a suitable later time. The active species prepared in the above manner may be thiocyanogen, thiocyanogen halide, isothiocyanogen halide or a mixture thereof.

The thiocyano or isothiocyano free radical may be prepared from the intermediate reactant by any suitable technique including the use of chemical reactants, e.g., peroxides; or by the use of electromagnetic radiation; heat; or other suitable means. A preferred method for preparing free radicals is to employ controlled amounts of light of a frequency sufficient to cause free radical formation. Generally, light falling into the general description of ultraviolet or visible radiation is sufficiently energetic to initiate free radical formation. Any suitable source of light may be employed such as mercury lights, electric arcs, sunlight, lasers tuned to a suitable wavelength, flash tubes, etc. A photosensitizer such as an aromatic quinone, halogenated hydrocarbons or other known sensitizers may be employed for efficient generation of thiocyano or isothiocyano free radicals. The photosensitizer may be used in minor or major amounts. Generally, as little as about 1 percent by weight is effective. Where a halocarbon photosensitizer is employed, large amounts may be employed. In such event, the photosensitizer is also employed as the solvent for the process.

In an ionic process the thiocyanate or isothiocyante ions are generated by any suitable method including chemical or electrochemical methods. Chemical methods include the use of oxidizing agents such as chlorine or other halogen, permanganate, etc., or a catalyst. Exemplary catalysts are Lewis acids, especially halogens or the well-known metal halides, such as aluminum trichloride, ferric chloride, etc.

The process may be conducted in an inert solvent such as acetic acid, anhydrous ether or more preferably a halohydrocarbon or halocarbon such as dichloromethane, chloroform, tetrachloromethane, 1,2-dichloroethane, 1,1,2-trichloroethane, 1,1-dichloroethane, 1,1,1-trichloroethane, tetrafluoromethane, trichlorofluoromethane, 1,1,2-trichlorotrifluoroethane etc. Additionally, the process may be conducted in aromatic solvents such as benzene, toluene, orthodichlorobenzene etc. An inhibitor to prevent polymerization of thiocyanate or isothiocyanate moieties may also be included if desired.

Generally, temperatures from about 0° C. to about 75° C. may be employed for the functionalizing process. Reduced or ambient temperatures are preferred in order to minimize decomposition losses of the thiocyano or isothiocyano generating reactant. A preferred temperature is from about 20° C. to about 50° C.

The amount of functionality incorporated into the polymer may vary depending on the nature of the polymer, the thiocyano or isothiocyano generating reactant, temperature, length of reaction, etc. At least a minor amount of functionality is added to the polymer. By the term "a minor amount" is meant that the amount of functionality added is at least an amount effective to provide altered physical or chemical properties in the polymer. Examples of suitable means to determine the existence of altered physical or chemical properties include the measure of adhesive strength of laminates formed therefrom; the gas permeability or paint adhesion of treated samples compared to untreated samples; increased intrinsic viscosity compared to unmodified samples or other suitable test. Preferably, from about 0.001 percent to about 10 percent by weight and most preferably, from about 0.01 percent to about 1 percent based on unfunctionalized polymer of functionality is added. In the case of a solid polymer, because the added functionality is concentrated at the available surface thereof, even a small added amount is effective to provide greatly altered physical properties. As previously stated such functionality comprises the reaction product of the polymer and the thiocyano or isothiocyano generating reactant. Preferably, such functionality comprises thiocyanate or isothiocyanate groups, most preferably, thiocyanate groups.

SPECIFIC EMBODIMENTS

Having described the invention, the following examples are provided as further illustrative and are not to be construed as limiting inasmuch as variations and modifications within the scope of the present invention will be readily apparent to the skilled artisan.

EXAMPLE 1

Thiocyanation of Polyethylene Powder

In a stirred glass reaction vessel, 100 ml of tetrachloromethane containing 3.23 g of lead thiocyanate, $Pb(SCN)_2$, is cooled by means of an ice bath to a temperature of about 20° C.–30° C. Chlorine gas (3.2 g) is introduced into the stirred mixture in two increments over a 15-minute period. After additional stirring for 15 minutes the liquid is filtered to remove lead chloride and the filtrate returned to the flask. A mixture of recrystallized polyethylene powder (DOWLEX ® 2047, 2.0 g) is added to the flask. The ice bath is removed and a Black Ray B100-A long wave ultraviolet lamp is positioned under the flask. After irradiating for 24 hours at 25° C., stirring is stopped and the polyethylene powder is separated by vacuum filtration, washed with tetrachloromethane two times and aspirated to remove solvent.

The recovered sample is digested and analyzed by Nessler Colorimetric Determination for nitrogen content, Perkin Elmer CHN analyzer for carbon content, and standard mercury titration for sulfur content. Results by weight indicate the presence of a 1:1 mole ratio of nitrogen to sulfur representing about 1 percent substitution expressed as thiocyanate functionality.

EXAMPLE 2

The reaction conditions of Example 1 are substantially repeated excepting that the polyethylene powder in contact with the thiocyanation solution is maintained at about 50° C. by the use of infrared heat lamps. Irradiation is continued for 3 hours. After this time period, the polyethylene is recovered. Analysis in the same manner as previously described indicates the presence of about 1 percent by weight expressed as thiocyanate functionality.

EXAMPLE 3

The reaction conditions of Example 1 are substantially repeated employing powders of polypropylene and a styrene/acrylonitrile copolymer (Tyril ® resin available from The Dow Chemical Company). Analysis indicates successful surface incorporation of thiocyanate functionality in each polymeric sample.

EXAMPLE 4

Bonding of Polyolefins

Small samples of polyethylene film are thiocyanated by treatment substantially according to the procedure of Example 1. Accordingly, a sheet of polyethylene film (DOWLEX ® 2047) approximately 1.2 g, 0.1 mm thick, is submerged in carbon tetrachloride solution prepared by contacting at 50° C. with stirring in 250 ml CCl4, lead thiocyanate (3.23 g) and chlorine (2.7 g added over 20 minutes). After reaction for 10 minutes at 50° C., the reaction mixture is filtered and transferred to a 1000-ml beaker for treatment of polymer samples.

Treatment of films comprises irradiation with ultraviolet light ("long" wavelength) at 50° C. by a Black Ray Model B100-A light placed approximately 10 cm above the beaker containing the polymer film and the thiocyanating solution. After irradiation for 5 minutes, the film is removed, rinsed with CCl4 and drained on a paper towel.

The thiocyanated polymer films are heat sealed to nylon (nylon 6) and to polypropylene films each 0.1 mm thick by heat sealing in an ASKCO seven point heat sealer. Bond pull-apart strengths are measured using an INSTRON tensile strength analyzer. Pull strengths and comparative pull strengths of unfunctionalized equal sized and shaped films are contained in Table I. Adhesion strength is measured as the force required to cause separation at the film bond.

TABLE I

| Film A | Film B | Bonding Temp °C. | Bonding Time sec | Adhesion Strength lb/in (Newton/cm) | |
|---|---|---|---|---|---|
| Thiocyanated Polyethylene | Nylon | 170 | 1 | 0.64 | (1.12) |
| Untreated Polyethylene | Nylon | 170 | 1 | <.1 | (<.175) |
| Thiocyanated Polyethylene | Polypropylene | 104 | 1 | 1.74 | (2.61) |
| Untreated Polyethylene | Polypropylene | 104 | 1 | 0.02 | (0.35) |

EXAMPLE 5

Polyethylene powder (DOWLEX ® 2047) prepared substantially according to the procedure of Example 1 is hot pressed for 7 minutes at 157° C. onto nylon and polypropylene substrate films. The resulting laminated films are cut into 1-inch (2.5 cm) wide strips and pull-apart strengths measured by an INSTRON tensile strength analyzer. Results compared with samples of untreated hot pressed polymer films are contained on Table II.

TABLE II

| Substance A | Substance B | Adhesion Strength lb/in (Newton/cm) | |
|---|---|---|---|
| Thiocyanated Polyethylene Powder | Polypropylene Film | 0.36 | (0.63) |
| Untreated Polyethylene Powder | Polypropylene Film | 0.0086 | (0.02) |
| Thiocyanated Polyethylene Powder | Nylon Film | 0.05 | (0.09) |
| Untreated Polyethylene Powder | Nylon Film | Nil | |

It is seen by comparison of the results of Examples 4 and 5 that laminated layers of polyethylene and other solid polymers may be obtained without the use of adhesive layers by applying heat and pressure to bond polyethylene having surface thiocyanate functionality to nylon, polypropylene or other substrate polymers.

EXAMPLE 6

Rigid polyurethane foam is prepared having polyethylene film backing. Accordingly, polyethylene film (DOWLEX ® 2047) surface treated with thiocyanate functionality substantially according to the technique of Example 4 and comparative samples of unfunctionalized film are covered with a polyurethane formulation comprising the following ingredients in the indicated parts by weight:

| | |
|---|---|
| polyol: VORANOL ® 360[1] | 100.0 |
| methylene diphenyl diisocyanate: | 89.8 |
| blowing agent: Freon ® 11 | 47.0 |
| surfactant: L-5340[2] | 1.5 |
| amine catalyst: 33LV[3] | 2.0 |
| metal catalyst: UL-6[4] | 0.3 |

[1]available from The Dow Chemical Company
[2]available from Union Carbide Corporation
[3]available from Air Products Co.
[4]available from M and P Chemical Co.

After curing for 15 days, the film-backed rigid foams (approximately 10 cm thick) are cut into equal slices approximately 2.5 cm wide and 2.5 cm thick, and the adhesive strength of the films to the rigid foams are measured by an INSTRON tensile strength analyzer. Comparative data are contained in Table III.

TABLE III

| Adhesion Strength to Polyurethane Foam | | |
|---|---|---|
| Specimen | Adhesion Strength lb/in (Newtons/cm) | |
| Thiocyanated Polyethylene Film | 2.08 | (3.64) |
| Untreated Polyethylene Film | 0.03 | (0.05) |

It is seen by comparison of the results in Table III that significantly increased adhesion of polyurethane articles to polyethylene may be achieved without the use of adhesives by surface treating the polyethylene to provide thiocyanate functionality and thereafter forming and curing the polyurethane while in contact with the polyethylene film.

EXAMPLE 7

Membrane Permeability

A sample of SARAN ® polyvinylidene chloride film is surface treated with thiocyanate substantially according to the procedure of Example 4. Thiocyanated films (0.02 mm thick) are contacted with carbon dioxide and methane gases at a differential pressure of approximately 5 psi to measure diffusion rates therethrough. Results compared to untreated films are contained in Table IV.

TABLE IV

Permeation of $CO_2$ and $CH_4$ through SARAN ® Film

| | Thiocyanated Film | Untreated Film |
|---|---|---|
| $CO_2$ | 1.583 mg/min/m$^2$ | 6.52 × 10$^{-1}$ mg/min/m$^2$ |
| $CH_4$ | 5.43 × 10$^{-4}$ mg/min/m$^2$ | 2.0 × 10$^{-3}$ mg/min/m$^2$ |

It is seen that surface thiocyanated polyvinylidene chloride films are rendered more permeable to passage of carbon dioxide than untreated film. However, surface thiocyanated polyvinylidene chloride is less permeable to passage of methane than is untreated film. Accordingly, carbon dioxide may be selectively separated from a mixture of carbon dioxide and methane by contacting with one or more membranes prepared from thiocyanated films of the present invention.

Additional suitable polymers that may be surface-modified to alter the permeability thereof include polyether sulfone and polystyrene. Additional gases such as sulfur dioxide, $H_2S$, CO, etc., may also be separated by the films of this invention.

EXAMPLE 8

Paint Adhesion and Wet Out

A thin rectangular shaped polyurethane solid is prepared by reaction injection molding in molds coated with a wax based release compound using a formulation containing an internal mold release agent comprising the following ingredients in the indicated parts by weight:

| Polyol (XUS14003 available from The Dow Chemical Company) | 26.4 |
|---|---|
| D-400 (available from Texaco Inc.) | 2.0 |
| zinc stearate | 0.8 |
| oleoyl sarcosine | 0.8 |
| methylene diphenyl diisocyanate modified to the liquid at room temperature (Mondur ® PF available from Mobay Chemical Company) | 64.5 |
| diethyltoluenediamine chain extender | <1.0 |

In a stirred glass reaction vessel 100 ml of tetrachloromethane containing 3.23 g of lead thiocyanate, Pb(SCN)$_2$, is cooled by means of an ice bath to a temperature of about 20° C.-30° C. Chlorine gas (3.2 g) is introduced into the stirred mixture in two increments over a 15-minute period. After additional stirring for 15 minutes the liquid is filtered to remove lead chloride and the filtrate returned to the flask.

The polyurethane sample is dipped into the thiocyanogen solution for 15 sec. The sample is then heated in an oven for 20 min. at 135° C. After cooling at room temperature a coating of high solids alkyd enamel (PPG 1060 available from PPG Industries) is applied and oven cured at 135° C. for 30 minutes.

A sample area is marked by scoring and the film is cut leaving grid lines approximately 3 mm separation vertically, horizontally and diagonally in two directions. The cuts were deep enough to cut through the paint film. Specimens prepared as indicated are placed in a stirred water bath at 38° C. for a total of 96 hours. Afterwards, the painted surfaces are scraped ten times with a razor blade in each of two directions. The number of cross-hatched sections removed is observed. Failure percent is calculated as the percentage of total cross-hatch flakes removed by the above procedure. Results are contained in Table V.

TABLE V

| Specimen | Total Cross-hatched Sections | Cross-hatched Sections with Paint Failure | % Failure | Wet Out Relative Scale (1-worst) (10-Best) |
|---|---|---|---|---|
| Untreated | 128 | 128 | 100 | 1 |
| Thiocyanated | 171 | 8 | 4.7 | 10 |

It should be noted that the polyurethane composition which normally would possess inferior paint adhesion due to the presence of the internal mold release agent demonstrates greatly improved adhesion as a result of treatment according to the present invention.

X-Ray diffraction studies involving accelerated aging (30 minutes, 135° C.) to test for zinc stearate migration indicate substantially no increase in surface zinc stearate levels. This result would suggest improved long term paint adhesion compared to untreated samples can be expected.

EXAMPLE 9

Crosslinking of Linear Low Density Polyethylene

Dowlex ® 2047 brand of linear low density polyethylene is purified by recrystallization from xylene. The recrystallized polymer is washed with carbon tetrachloride. In a separate flask, lead thiocyanate (3.23 g), is added to 100 ml of carbon tetrachloride (spectrograde). The resulting slurry is cooled to about −4° C. in an ice bath and chlorine gas (1.6 g) is added. The mixture is stirred for about 10 minutes when an additional amount of chlorine (1.6 g) is added and stirring continued. Remaining solids are removed by filtration and the recrystallized linear low density polyethylene powder (1 g) is added. The mixture is maintained at 40° C. under a mercury light for 24 hours.

After recovery, washing with carbon tetrachloride, and drying, the powder is pressed into a film at 400° C. and 2×10$^8$ Pa. The recovered polymer film is tested for intrinsic viscosity and compared to a film of unmodified polymer prepared at similar conditions of heat and pressure. Results are contained in Table VI.

TABLE IV

| Specimen | Intrinsic Viscosity (kpoise) |
|---|---|
| thiocyanated polymer | 35 |
| Untreated polymer | 18 |

The results indicate the formation of crosslinking bonds in the thiocyanate modified polymer.

EXAMPLE 10

Solution Modification of Polycarbonate

A thiocyanogen containing solution is prepared by combining 250 ml of methylene chloride in a 500 ml flask. Lead thiocyanate Pb(SCN)$_2$, (13.2 g) is added with vigorous stirring. Bromine (6.4 g) is added to the suspension. Stirring is continued until loss of color occurs. The resulting solution is filtered and employed without further treatment.

Polycarbonate resin (Novarex ® available from Mitsubishi Chemical Industries Ltd.) (60 grams) is dissolved in methylene chloride (240 g). The resulting solution is combined with the thiocyanogen containing solution with stirring. The resulting mixture is irradiated with ultraviolet light for about 90 minutes. The resulting solution is filtered and a modified polycarbonate film recovered by evaporation of methylene chloride.

When tested for carbon dioxide permeability the treated film demonstrates greatly improved barrier compared to an untreated film.

EXAMPLE 11

Solution Modification of Chlorinated Polyethylene

A thiocyanogen containing solution is prepared substantially according to the procedure of Example 10. After preparation, chlorinated polyethylene powder (1 percent based on solvent weight) is added with stirring. The mixture is heated with continued stirring to 50° C. and irradiated with ultraviolet light for one hour. The resulting solution is filtered and a film of modified polymer prepared by solvent evaporation. Analysis of the resulting product confirms the presence of sulfur and nitrogen functionality in about equal molar percentages. Substantially no sulfur or nitrogen functionality is observed in unmodified film.

EXAMPLE 12

1,2-dichlorobenzene solvent

Lead thiocyanate (13.2 g) and bromine (6.4 g) are combined in 1,2-dichlorobenzene solvent substantial according to the procedure previously described in Example 10. A small amount of the resulting filtered solution (50 g) is combined with polyethylene fibers (1.0 g) in a closed glass bottle. The bottle is exposed to direct sunlight for approximately 30 minutes. The fibers are recovered by filtration and washed with 1,2-dichlorobenzene. Upon drying the fibers are analyzed and shown to contain both sulfur and nitrogen functionality. Infrared spectroscopy indicates the presence of thiocyanate functionality.

EXAMPLE 13

Vapor Phase Modification

A solution of thiocyanogen in tetrachloromethane is prepared substantially according to the procedures employed in Example 1. Approximately 20 ml of the thiocyanogen solution is placed in an uncovered evaporation dish. A film of linear low density polyethylene (Dowley 2047 available from The Dow Chemical Company) is stretched over the dish leaving a space between the film and the surface of the liquid. A watch glass is placed on top of the film. The apparatus is placed in a 60°C. oven and exposed to ultraviolet light for about 7.5 minutes. The film is removed, rinsed with CCl$_4$ and dried. Analysis indicates the presence of sulfur in the modified film and essentially no sulfur in the unmodified film.

What is claimed is:

1. A modified polymer comprising the reaction product of (a) a precursor polymer substantially devoid of ethylenic unsaturation, and (b) a thiocyano or isothiocyano free radical or ion generating reactant prepared by contacting a and b under free radical or ion generating reaction conditions characterized in that the modified polymer is a solid having a surface portion and an interior portion such that the surface portion comprises the reaction product of the thiocyano or isothiocyano free radical or ion generating reactant and the precursor polymer and the interior portion is substantially devoid of such reaction product.

2. A modified polymer according to claim 1 wherein the surface portion comprises an outer layer no more than about one micron thick.

3. A modified polymer according to claim 1 comprising at least some thiocyanate or isothiocyanate functionality.

4. A modified polymer according to claim 1 wherein the polymer prior to modification comprises an addition polymer or condensation polymer.

5. A modified polymer according to claim 4 wherein the polymer prior to modification comprises a polymeric or copolymeric addition product of one or more ethylenically unsaturated monomers; a ring opened reaction product; a polyester, a polyurethane, a polyamide, a polyether, a polycarbonate, a polysulfone, a polyimide, a silicone polymer, or a mixture thereof.

6. A modified polymer according to claim 5 wherein the polymer prior to modification comprises a homopolymer or copolymer of one or more monomers selected from the group consisting of olefins, substituted olefins, monovinyl aromatics, ethylenically unsaturated carboxylic acids and esters thereof.

7. A modified polymer according to claim 6 wherein the polymer prior to modification is polyethylene; polypropylene; a copolymer of ethylene and one or more α-olefins; polyvinyl chloride; a copolymer of vinylidene chloride and at least one comonomer; a polystyrene; polyvinyltoluene; polymethyl methacrylate; polybutylacrylate; polyvinylacetate; styrene/acrylic acid; stryrene/maleic anhydride; styrene/acrylonitrile; or ethylene/acrylic acid.

8. A modified polymer according to claim 3 wherein the amount of functionality added to the polymer is from about 0.001 percent to about 10 percent by weight.

9. A modified polymer according to claim 8 wherein the amount of functionality added to the polymer is from about 0.01 percent to about 1 percent by weight.

10. A modified polymer according to claim 1 wherein the precursor polymer is contacted with a thiocyano free radical or ion generating reactant.

11. A modified polymer according to claim 10 wherein the thiocyano free radical or ion generating reactant is prepared by contacting a metal thiocyanate with halogen in solution.

12. A modified polymer according to claim 11 wherein the metal thiocyanate is lead thiocyanate.

13. A modified polymer according to claim 10 wherein the polymer is contacted with a solution of the thiocyano free radical or ion generating reactant while simultaneously irradiating the polymer surface with ultraviolet light.

14. A composition of matter comprising a solid polymer according to claims 1 or 3 and a dissimilar polymer bonded to the surface thereof.

15. A composition of matter according to claim 14 wherein the dissimilar polymer is bonded to the surface of the solid polymer without an adhesive interlayer.

16. A composition of matter according to claim 1 or 3 additionally comprising a surface coating of an organic polymer film.

17. A composition of matter according to claims 1 or 3 having been crosslinked so as to form bonds between neighboring functional groups.

18. A process for modifying a polymer comprising contacting a solid precursor polymer that is substantially devoid of ethylenic unsaturation with a thiocyano or isothiocyano free radical or ion generating reactant under free radical or ion generating reaction conditions so as to incorporate therein the reaction products formed by such contact.

19. A process according to claim 18 wherein the precursor polymer is contacted with a thiocyano free radical or ion generating reactant.

20. A process according to claim 18 wherein the thiocyano free radical or ion generating reactant is prepared by contacting a metal thiocyanate with halogen in solution.

21. A process according to claim 20 wherein the halogen is chlorine or bromine.

22. A process according to claim 18 wherein a halocarbon solvent is present.

23. A process according to claim 18 wherein the metal thiocyanate is lead thiocyanate.

24. A process according to claim 18 wherein the polymer is contacted with a solution of the thiocyano free radical or ion generating reagent while simultaneously irradiating the polymer with ultraviolet light.

25. A process according to claim 18 wherein at least some thiocyano or isothiocyano functionality is incorporated into the polymer.

26. A process according to claim 18 or 25 wherein the amount of functionality incorporated into the polymer is from about 0.001 percent to about 10 percent by weight.

27. A process according to claim 18 or 25 wherein the polymer is a solid polymer having a surface portion and an interior portion and the functionality incorporated into the polymer is incorporated substantially entirely into the surface portion.

28. A process according to claim 18, 25 or 27 wherein the functionality is incorporated by substitution of reactive hydrogen originally present in the polymer.

* * * * *